United States Patent

[11] 3,595,091

| [72] | Inventor | Paul Bernutat |
| | | Cecilien Allee 68, 4000 Dusseldorf, Germany |
| [21] | Appl. No. | 879,311 |
| [22] | Filed | Nov. 24, 1969 |
| [45] | Patented | July 27, 1971 |
| [32] | Priority | Nov. 25, 1968 |
| [33] | | Germany |
| [31] | | P 18 10 711.4 |

[54] METHOD AND APPARATUS FOR DETERMINING THE GRAIN STRUCTURE OF DISPERSED SOLID MATERIALS AND FOR DETERMINING THE INSTANTANEOUS SOLID MATERIAL CONTENT OF FLOWING GASES
4 Claims, 4 Drawing Figs.

| [52] | U.S. Cl. | 73/432 PS |
| [51] | Int. Cl. | G01n 15/02 |
| [50] | Field of Search | 73/432 PS, 28, 211 |

[56] References Cited
UNITED STATES PATENTS

| 3,141,337 | 7/1964 | Hoffstrom | 73/432 PS |
| 3,478,599 | 11/1969 | Tatsuo Tanaka | 73/432 PS |

FOREIGN PATENTS

| 1,013,446 | 8/1957 | Germany | 73/432 |

*Primary Examiner*—S. Clement Swisher
*Attorney*—Walter Becker

ABSTRACT: A method of and device for determining the grain structure of dispersed solid materials and for determining the momentary contents in solid particles in a gas flow, according to which the solid particle-gas flow is in a measuring nozzle subjected to a change in velocity, and in which the pressure differences inherent to the different behavior of the solid particles in said gas flow during the change in the velocity of the gas flow are measured over the length of the measuring nozzle whereupon from the course in the change of pressure over the length of the nozzle the grain structure of the dispersed solid particles and the momentary contents in solid particles are calculated.

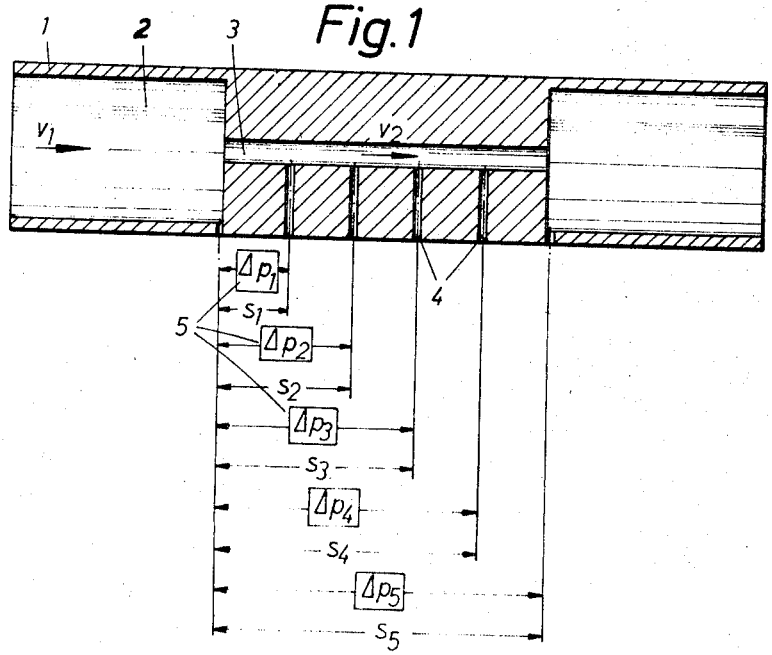
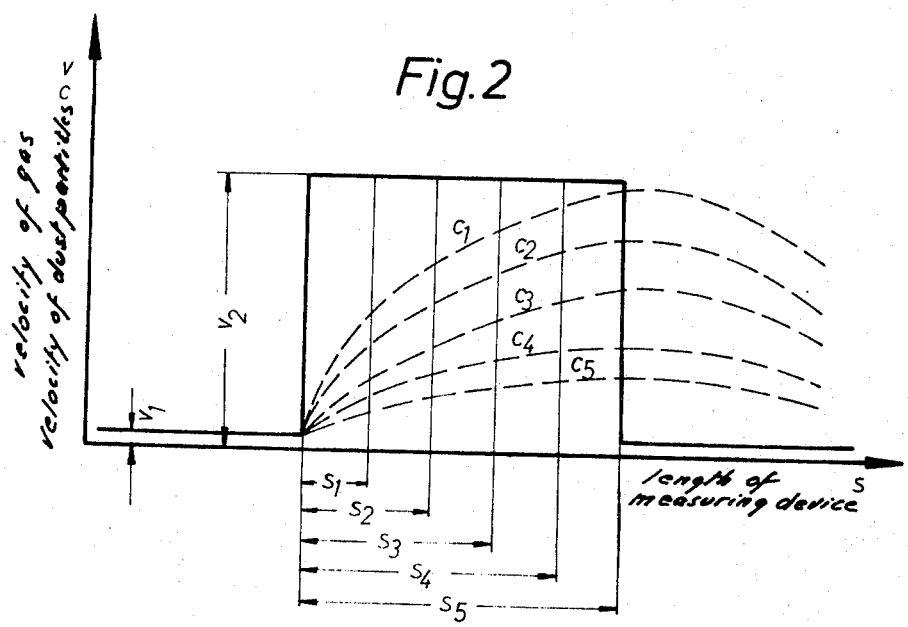

METHOD AND APPARATUS FOR DETERMINING THE GRAIN STRUCTURE OF DISPERSED SOLID MATERIALS AND FOR DETERMINING THE INSTANTANEOUS SOLID MATERIAL CONTENT OF FLOWING GASES

The present invention relates to a method of and apparatus for determining the grain structure of dispersed solid materials and for determining the momentary solid particle content of flowing gases.

The analysis of the grain structure of dispersed solid materials requires relatively considerable time, particularly when the proportional contents of each grain fraction are to be ascertained the particles of which have a diameter of only a few $\mu$m. According to heretofore known methods, a complete grain analysis requires a time which varies from 20 minutes to several hours. These given examples for the time required refer, however, only to the analysis proper. If to this time the time is added which is required for carrying out the various manual operations and which is necessary after the analysis proper has been completed, as for instance the weighing of the sample, the weighing of the proportional contents of the individual fractions and, as the case may be, calculating the percentagewise weight components or the evaluation of graphic charts, it will be appreciated that complete grain analyses can hardly be carried out in one hour. For a fast control or checking of the grain structure of industrially produced useful dusts, as for instance cement, heretofore no methods and devices have been available which operate in a continuous or semicontinuous manner. Thus, the possibility does not exist of controlling the manufacturing process for technically usable dusts in such a way that the grain structure of such dusts can be varied in a desired manner.

It is, therefore, an object of the present invention to provide a method by means of which, while using standard devices and instruments, it will be possible in a practically continuous manner to carry out a complete grain analysis of dispersed solid materials within seconds.

It is another object of this invention to provide a method as set forth in the preceding paragraph which will not require a weighing of samples so that the method will be particularly suitable for controlling the manufacturing process of the grain structure of technically useful dusts.

It is still another object of this invention to provide a method as set forth in the preceding paragraphs, which will furnish the possibility of determining the respective momentary weight proportion of dispersed solid materials in flowing gases, for instance, during the emission of dust.

It is also an object of this invention to provide a simple apparatus for carrying out the method according to the invention.

These and other objects and advantages of the invention will appear more clearly from the following specification in connection with the accompanying drawings, in which:

FIG. 1 diagrammatically illustrates a longitudinal section through a measuring device according to the invention.

FIG. 2 represents a graph in which the solid lines indicate the velocity $v$ of the gas and the dish lines indicate the velocity $c$ of the various dust particles over the length $s$ of the measuring device.

Figure 3:
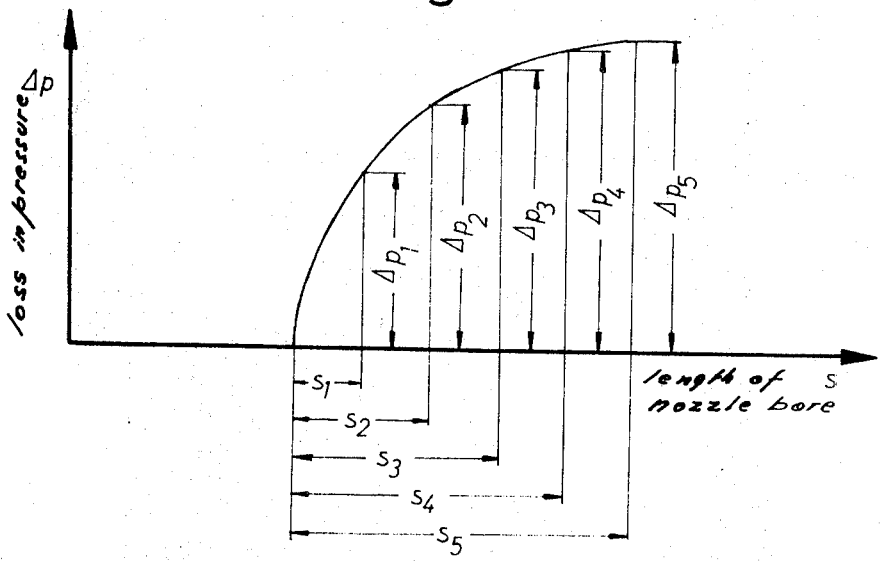
FIG. 3 represents a diagram which illustrates the course of the loss in pressure $\Delta p$ in the measuring nozzle over the length $s$ of the nozzle bore.

The method according to the present invention is based on the finding that dispersed solid materials which are accelerated or retarded in a gas flow by means of a suitable nozzle bring about a change in pressure in the gas flow which with the length of the nozzle monotonically increases or decreases, and the magnitude of which depends on the diameter of the solid particles and on the extent to which the gas flow is loaded with solid particles.

According to the method of the present invention, the gas-solid particle-mixture is in a measuring nozzle subjected to a change in velocity, the pressure differences resulting therefrom in view of a different behavior of the solid particles of different grain fractions are measured over the length of the measuring nozzle, and from the course in the change of pressure over the length of the nozzle there is calculated the grain structure of the dispersed solid particles as well as the respective momentary content of solid particles.

According to a further feature of the invention, the solid particles are introduced into the gas flow at a distance ahead of the measuring nozzle, which distance will suffice to impart a uniform velocity upon the gas-particle mixture, and the pressure differences are then, on the basis of the differential pressures, ascertained over the length of the measuring nozzle, said differential pressures being measured between the start of the measuring nozzle and various measuring stations respectively located at different distances from the start of the measuring nozzle.

According to a still further development of the method according to the invention, it is suggested to employ digital calculating machines which carry out the calculations and into which the values of the measured differential pressures are automatically introduced through the intervention of an analogous digital converter in digital form.

The apparatus for carrying out the method according to the invention is characterized primarily in that the measuring nozzle comprises a pipe section the bore of which in the central part thereof narrows down to a nozzle bore, and which is furthermore characterized in that within the range of said nozzle bore as well as at the start and end thereof there are provided radial bores for connection with differential pressure measuring means.

Referring now more specifically to the drawings, the measuring device shown in FIG. 1 comprises primarily a pipe section 1 with a measuring nozzle the nozzle bore 3 of which has a diameter which is considerably smaller than the diameter of the pipe bore 2. The cylindrical bore 3 represents the measuring nozzle proper. In order to be able to ascertain the course of the pressure in the measuring nozzle, the measuring nozzle is at certain distances or intervals provided with radial bores 4 to which are connected differential pressure measuring devices 5 of a standard design so that the differential pressure between the respective radial bore 4 and the start of the nozzle bore 3 will be measured. The distances between the start of the nozzle bore 3 and the respective radial bores 4 are designated with the letters $s_1$, $s_2$, $s_3$, $s_4$ and $s_5$, whereas the pertaining differential pressures are designated with the characters $\Delta p_1 - \Delta p_5$.

As will be seen from the diagram of FIG. 2, during the flow of the gas and solid particles through the measuring nozzle, the velocity $v$ of the gas and the velocities $c_1-c_5$ of the various solid particles change. For purposes of a better illustration, it may be assumed that the dispersed solid particles contained in the gas have a number of grain fractions which corresponds to the number of the radial bores 4, in other words, applied to the specific showing in the drawing, has five grain fractions or grain sizes while the particles within each grain fraction have the same diameter. It may furthermore be assumed that the extent to which the gas flow has been loaded with solid particles is such that a mutual interference of the solid particles will not occur.

When the dispersed solid particles are introduced into the gas flow at an appropriate distance ahead of the measuring nozzle, all solid particles will directly at the entrance of the nozzle bore 3 have approximately the same gas velocity $v_1$. Within the measuring nozzle, the velocity of the gas increases suddenly to the value $v_2$. On the other hand, the solid particles will, due to their inertia, not follow this sudden increase in velocity but will be subjected to different accelerations depending on their mass. The smallest solid particles with the diameter $x_1$ will be accelerated fastest. The curve indicating the course of the velocity which is designated with the character $c_1$ is therefore correspondingly steep. The largest solid particles which have a diameter $x_5$ are subjected to the lowest acceleration. The pertaining curve $c_5$ is therefore correspondingly flat. Thus, principally all solid particles are accelerated in a manner as if they were alone in the measuring nozzle. It is thus obvious that the velocities $c_1 - c_5$ of the solid particles as they prevail at the end of the measuring nozzle depend only on the mass or diameter of said solid particles.

Assuming that the solid particles are of ball shape, it is possible in a manner known per se to calculate the various velocities which the solid particles have reached at the respective distances $s_1 - s_5$ from the inlet of the measuring nozzle. Thus, it becomes possible to calculate the loss in pressure for the acceleration of the solid particles for each distance from the nozzle inlet, and this calculation may be effected by means of the impulse theorem.

The diagram of FIG. 3 illustrates the course of the loss in pressure over the length $s$ of the measuring nozzle. For the loss in pressure $\Delta p_1$ between the inlet of the measuring nozzle and the cross section at the distance $s_1$ from the inlet, the following equation is obtained:

$$f \times d(\Delta p_1) = (dm/dt)1 \text{bq} P dc_1 + (dm/dt)2 \times dc_2 \ldots + (dm/dt)5 \times dc_5$$

In this equation:

| | | |
|---|---|---|
| $f$ | is | the cross section of the measuring nozzle; |
| $(dm/dt)1$ to $(dm/dt)5$ | is | the respective momentary mass flow of the five grain fractions through a certain cross section within the distance $s_1$; |
| $dc_1$ to $dc_5$ | is | the increase in velocity of the solid particles of the various grain fractions when the same pass through said cross section. |

The equation indicates that the respective total loss in the pressure equals the total of the partial losses in pressure which occur due to the acceleration of the various grain fractions.

In an analogous manner the pressure loss can be determined for the distances $s_2$ to $s_5$. In this way five equations are obtained which after their integration furnish an inhomogeneous linear equation system:

$$\Delta p_1 = k_1 \Delta g_1 + k_2 \Delta g_2 + \ldots k_5 \Delta g_5$$
$$\Delta p_2 = k_6 \Delta g_1 + k_7 \Delta g_2 + \ldots k_{10} \Delta g_5$$
$$\vdots$$
$$\Delta p_5 = k_{20} \Delta g_1 + k_{21} \Delta g_2 + \ldots k_{25} \Delta g_5$$

In this equation system the left-hand represents the differential pressures whereas the right-hand side contains in addition to a total of 25 constants $k_1 - k_{25}$ obtained by the integration, the weights of the five grain fractions $\Delta g_1 - \Delta g_5$ expressed by the weight proportion which has passed per time unit through the measuring nozzle.

When the differential pressures $\Delta p_1 - \Delta p_5$ obtained from a measuring test are now inserted into the left-hand side of the equation system, the unknown weight of the grain fractions can be calculated from this equation system in a standard manner. The total of these weights furnishes the respective momentary solid material load of the gas flow as it occurs during the measuring test. After the weights of the various grain fractions have become known, all other values characterizing the grain structure can be calculated, as for instance the percentagewise components of the grain fractions and the specific surface.

The above assumptions, namely that the dispersed solid particles consist of a certain number of sharply differentiating grain fractions and that the splitting up of the grain structure is to be effected into precisely this number of fractions is, of course, not in conformity with the actual practical situation. As mentioned above, these assumptions were made merely for a better understanding of the method according to the invention. The method of the invention is naturally not limited to this assumption. It makes possible the division of the grain structure of dispersed solid particles into any desired number of grain fractions with any diameter intervals.

The fundamental structure of the linear equation system shows that the material dispersed in the gas can be divided up into a number of grain fractions which corresponds to the number of the stations for measuring the differential pressures. In other words, when n grain fractions are required, it is merely necessary to provide a measuring nozzle with $n$ differential pressure measuring stations. The distances at which the differential pressures are measured from the inlet of the measuring nozzle may be selected in conformity with desired conditions. Also the diameter intervals may, as is the case with any other method of grain analysis, be selected as desired. After these intervals have been determined, it will then be possible to calculate for each grain fraction a representative particle diameter which, being entered as constants of the linear equation system, makes possible the calculation of the respective weights of the grain fractions. The grain structure will, according to the present invention, be ascertained with a greater precision the greater the number of the grain fractions may be selected.

It is to be noted that the method according to the present invention will during the measuring period require a constant load of solid particles. Since, however, the time required by the solid particles for passing through the measuring nozzle amounts to only a few hundredths of a second, and since this time can be made to be identical with the measuring period, the requirement of a constant solid particle load is for all practical purposes always met since a change during this short period of the solid particle load is not to be expected, even when the solid particles are fed to the gas stream in volumetrically dosed quantities.

Figure 4:
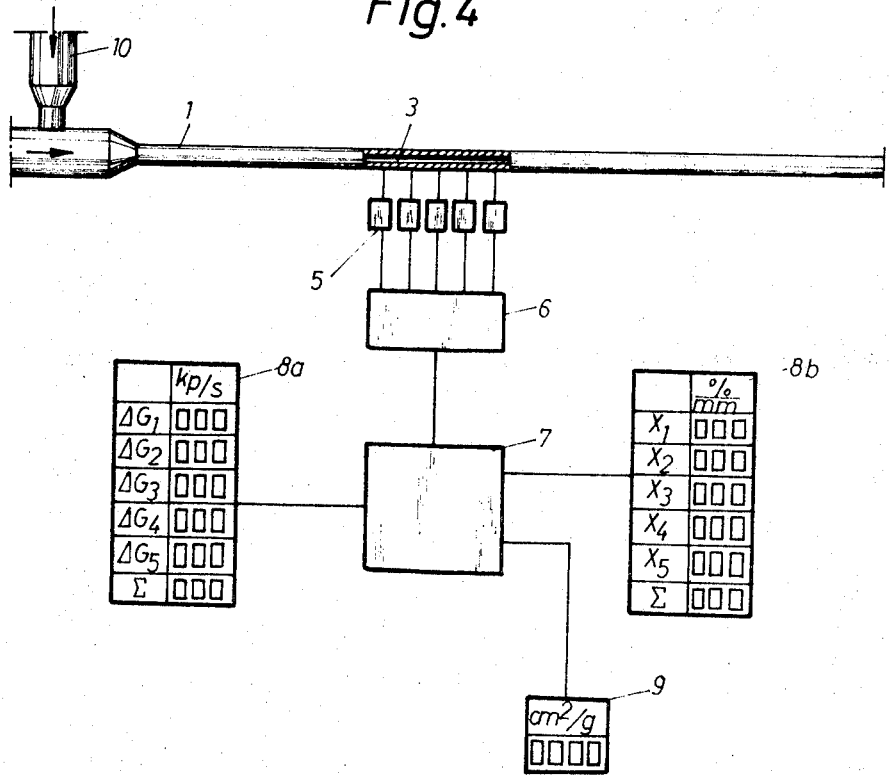
FIG. 4 illustrates a diagrammatic arrangement of a measuring device according to the invention which operates with a digital calculating machine.

In practice, the division of the grain structure into five fractions will suffice only in few instances. In most instances ten or more fractions will be necessary. Thus, the equation system necessary for determining this number of grain fractions will contain 10 or more unknowns the calculation of which by hand would require hours. This considerable calculating time may be reduced to seconds by having the calculating operations carried out by a digital calculating machine. The diagrammatic buildup of a measuring device according to the invention which operates with such digital calculating machine is diagrammatically illustrated in FIG. 4.

The dispersed solid material passes through a feeding pipe 10 into the pipe section 1 through which the gas flows, said pipe section 1 preceding the measuring nozzle with the nozzle bore 3. When the solid particles pass through the measuring nozzle, they will be accelerated in the above described manner whereby a corresponding loss in pressure will occur. The magnitude of this loss in pressure is measured by the differential pressure measuring devices 5 and in the form of an analogous direct current signal is conveyed to an analogous digital converter 6. The converter 6 furnishes the now digital measuring values to a digital calculating machine 7 which in conformity with its program calculates, for instance, the following magnitudes or values from the differential pressures:

The weights of the individual grain fractions as result of solving the linear equation system, and the sum of these weights which sum represents the respective momentary solid particle load. These values appear in an indicating register 8a. Furthermore, the percentagewise components of the grain fractions expressed in percent per particle diameter are calculated and appear in the indicating register 8b, and furthermore the specific surface is indicated by an indicating device 9.

The time required for calculating the aforementioned values depends on the capacity of the employed analogous digital converter 6 and the digital calculating machine 7. When employing corresponding devices, the calculating time can be reduced to seconds. In this way a practically continuous performance of grain analyses of dispersed solid particles is made possible whereby for the first time there is obtained the possibility of using the grain structure obtained during the manufacture of technically useful dusts as guiding factor for the manufacturing process itself.

It is, of course, to be understood that the present invention is, by no means, limited to the particular showing and method described in connection with the drawings, but also comprises any modifications within the scope of the appended claims.

What I claim is:

1. A method of determining the grain structure of dispersed solid particles and of the momentary solid particle contents in a gas flow, which includes the steps of passing the solid particle—gas flow through a measuring nozzle to subject said flow to a change in velocity, measuring the pressure differences at desired points over the length of said measuring nozzle, and from the course of the pressure changes over the length of said nozzle calculating the grain structure of the dispersed solid particles and the momentary contents in solid particles.

2. A method according to claim 1, which includes the steps of intermixing the solid particles intended for the solid particle gas flow prior to the gas flow entering said measuring nozzle and at such a distance from the nozzle inlet that a substantially uniform velocity of the solid particle—gas flow will be assured at said inlet, and measuring the pressure differences of said solid particle—gas flow over the length of the measuring nozzle on the basis of differential pressures measured between the inlet of said measuring nozzle and points thereof which are differently spaced from said nozzle inlet.

3. A method according to claim 2, which includes automatically feeding the values of the measured differential pressures into a digital calculating machine.

4. An apparatus for use in connection with the determination of the grain structure of solid particles dispersed in a gas flow, which includes a pipe having a first axial bore and a subsequent second axial bore forming a nozzle bore, and radial bores branching off from said nozzle bore and also at the inlet and outlet of said nozzle bore for connection with differential pressure measuring devices.